United States Patent
Hofius, Sr. et al.

[11] Patent Number: 6,041,164
[45] Date of Patent: Mar. 21, 2000

[54] EXPANSION AND MOUNTING APPARATUS FOR INFRARED RADIANT ENERGY SOURCE

[76] Inventors: David V. Hofius, Sr., 235 Pierce Ave., Sharpsville, Pa. 15150; Mark W. Hofius, 429 Line St., Sharpsville, Pa. 16150

[21] Appl. No.: 09/185,819

[22] Filed: Nov. 4, 1998

[51] Int. Cl.[7] ............................................. H05B 3/00
[52] U.S. Cl. .................... 392/407; 219/553; 219/552; 219/542; 219/539; 219/536; 338/316; 338/296; 338/333
[58] Field of Search .................. 392/407, 433, 392/440; 219/553, 552, 542, 538, 536, 200, 270, 539; 338/316, 276, 333; 174/126.1, 133 R

[56] References Cited

U.S. PATENT DOCUMENTS

| | | | |
|---|---|---|---|
| 1,756,444 | 4/1930 | Von Brockdorff | 338/316 |
| 1,992,588 | 2/1935 | Trombetta et al. | 219/552 |
| 2,416,599 | 2/1947 | Victoreen | 338/316 |
| 2,715,671 | 8/1955 | Harrison | 219/542 |
| 2,747,071 | 5/1956 | Schlumbohn | 338/316 |
| 3,223,875 | 12/1965 | Eggers | 392/407 |
| 3,345,622 | 10/1967 | Matsushita | 219/536 |
| 3,522,574 | 8/1970 | Giler | 219/270 |
| 3,612,822 | 10/1971 | Edin | 219/553 |
| 3,627,989 | 12/1971 | Heidler et al. | |
| 4,584,464 | 4/1986 | Myer | 219/552 |
| 4,774,396 | 9/1988 | Salit et al. | 219/553 |
| 4,812,620 | 3/1989 | Hayakawa et al. | |
| 5,113,479 | 5/1992 | Anderson et al. | |
| 5,444,814 | 8/1995 | Hofius, Sr. | |
| 5,628,859 | 5/1997 | Janin et al. | |
| 5,965,050 | 10/1999 | Ripley et al. | 219/552 |

FOREIGN PATENT DOCUMENTS

| | | | |
|---|---|---|---|
| 514671 | 10/1952 | Belgium. | |
| 1162390 | 9/1958 | France. | |
| 52-36345 | 3/1977 | Japan | 219/542 |
| 1077806 | 3/1984 | Russian Federation. | |
| 696218 | 8/1953 | United Kingdom | 219/553 |
| 1261748 | 1/1972 | United Kingdom | 219/553 |

*Primary Examiner*—John A. Jeffery
*Attorney, Agent, or Firm*—Harpman & Harpman

[57] ABSTRACT

Infrared wire element configurations allow for expansion during use in a thermoplastic welding environment. A mounting apparatus for the infrared wire expansion configuration provides support.

12 Claims, 5 Drawing Sheets

EXPANSION AND MOUNTING APPARATUS FOR INFRARED RADIANT ENERGY SOURCE

BACKGROUND OF THE INVENTION

1. Technical Field

This device relates to infrared technologies for thermoplastic welding using wire configurations to generate infrared energy for non-surface contact with work pieces to be joined.

2. Description of Prior Art

Prior art devices of this type used to supply infrared energy use a plurality of thin wire elements which when electrically energized generate infrared energy. The wire elements are mounted to a fixture so as to direct the radiant infrared energy to the work piece which is positioned in spaced relation thereto. Normally, as the wires are heated by the application of electrical energy, they expand increasing their longitudinal length and therefore cannot be fixed, but must be allowed room for expansion in their mounting apparatus. Prior art mounting solutions often have buckling or bending occurring as the wire expands typically 0.0006 of an inch. Such mounting systems include mounting sleeves around the wire to insulate and provide for movement. A variety of infrared energy source generating devices and their mounting apparatus can be seen for example in U.S. Pat. Nos. 3,627,989, 4,812,620, 5,113,479, 5,444,814, 5,628,859 and foreign patents, see French patent 1,162.390 and Russian patent 1077806.

In U.S. Pat. No. 3,627,989 discloses an infrared surface heater having a plurality of quartz tubes with modular mounted heating elements within.

U.S. Pat. No. 4,812,620 illustrates a combined radiant energy heat source unit in which a light transmission shield plate is disposed over an irradiation opening.

U.S. Pat. No. 5,113,479 discloses a method for infrared heating on a continuous thermoplastic laminate with mounting infrared energy source.

Applicant's own U.S. Pat. No. 5,444,814 discloses a control in directing infrared energy by use of energy valving.

U.S. Pat. 5,628,859 is directed to a method of heating by emission of electromagnetic irradiation using a coiled wire element.

French Patent 1.161.390 shows an infrared wire mounting for continuous output.

Russian Patent 1077806 shows an electric infrared heater for welding plastic parts.

SUMMARY OF THE INVENTION

Infrared wire elements and mounting support system that allows for linear wire expansion that isolates and insulates the infrared wire from a mounting fixture. Selective deformation of infrared wire contours provide for directed expansion to be accommodated in specific areas of the wire.

DESCRIPTION OF THE PREFERRED EMBODIMENT

Figure 1:
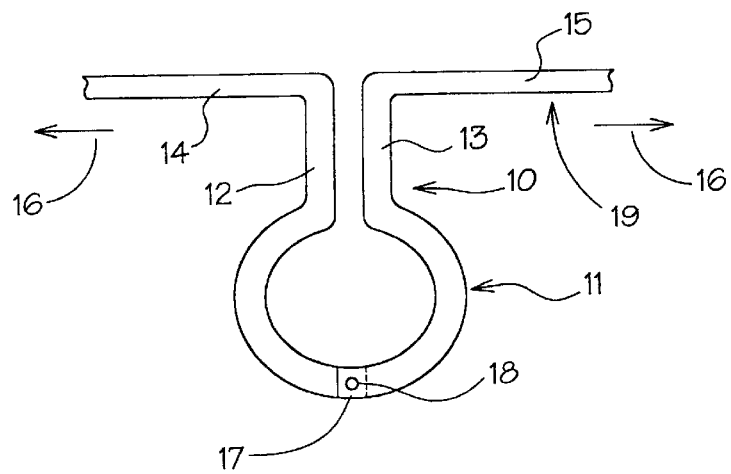
FIG. 1 is a top plan view of a flat infrared wire expansion loop with overlapping interlocking fasteners.
Figure 2:
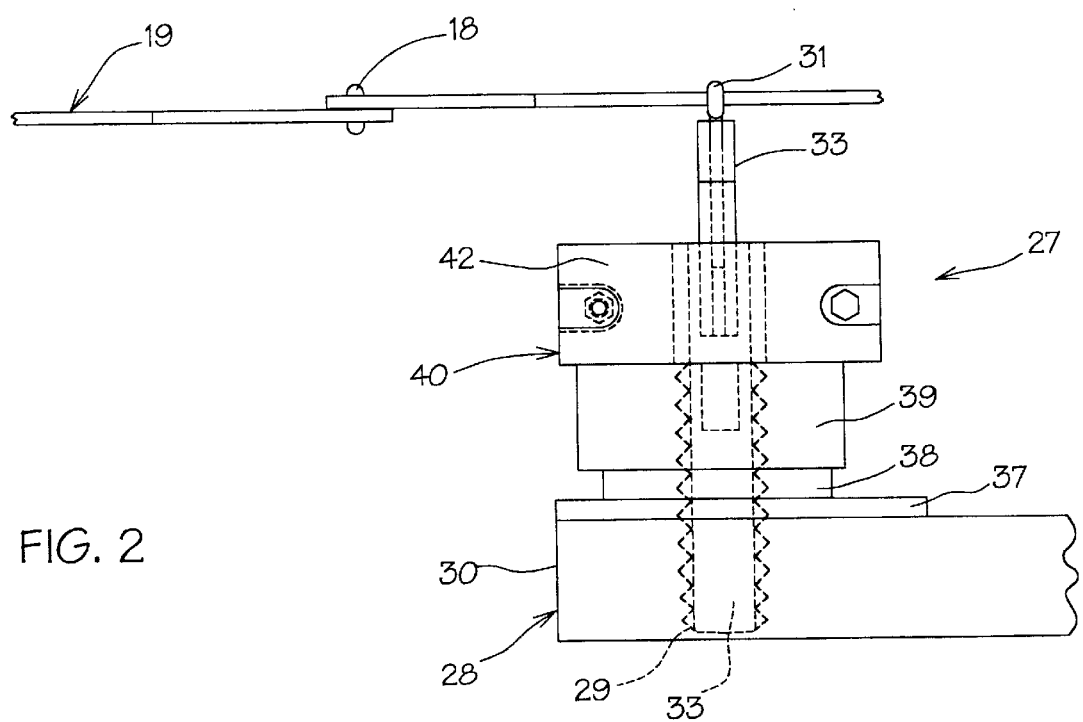
FIG. 2 is a side elevation of the expansion loop of FIG. 1 and mounting support fixture associated therewith.

Referring to FIGS. 1, and 2 of the drawings, multiple shaped infrared wire configurations can be seen wherein a cross-sectionally flat wire 10 illustrated in FIG. 1 has an expansion loop portion 11 formed therein extending from spaced parallel wire portions 12 and 13 that are formed at right angles to respective main body wire portions 14 and 15. The expansion loop portion 11 allows for the longitudinal expansion of the main body wire portions 14 and 15 as indicated by directional expansion arrows 16 which occurs upon electrical energization from a power source (E) that will be well known to those skilled in the art.

The loop portion 11 is formed in spaced planar relation to the respective main wire portions 14 and 15. A joining fitting 17 shown in FIG. 1 and in FIG. 2 having apertured wire ends that are overlapped and are secured to one another by fixation fastener 18. This arrangement allows for formation of a continuous wire section 19 from segmented portions as in this example from the respective wire loop portions 11.

Figure 7:
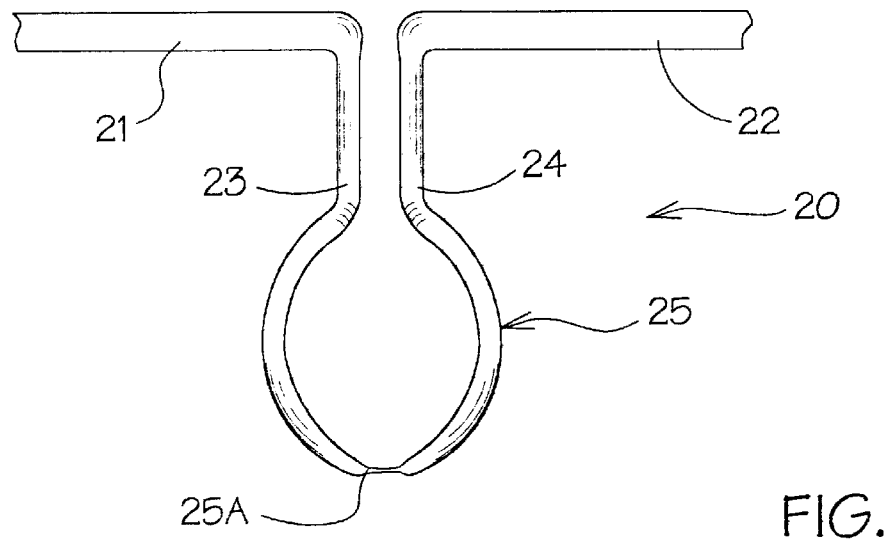
FIG. 7 is a top plan view of the modified flat wire with a rounded wire expansion loop with a thermal hinge portion.
Figure 8:
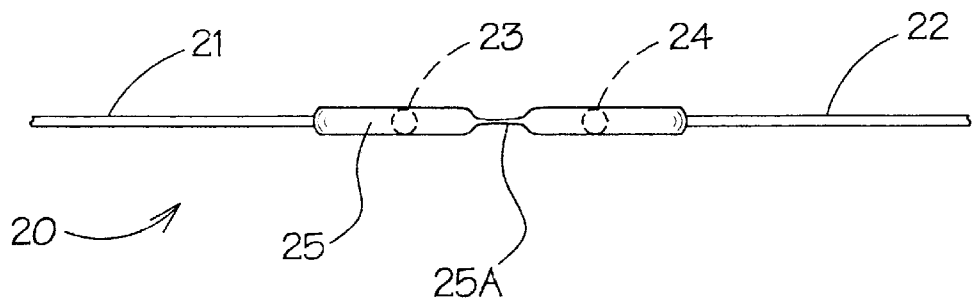
FIG. 8 is a side elevation view of the modified flat wires of the invention.
Figure 9:
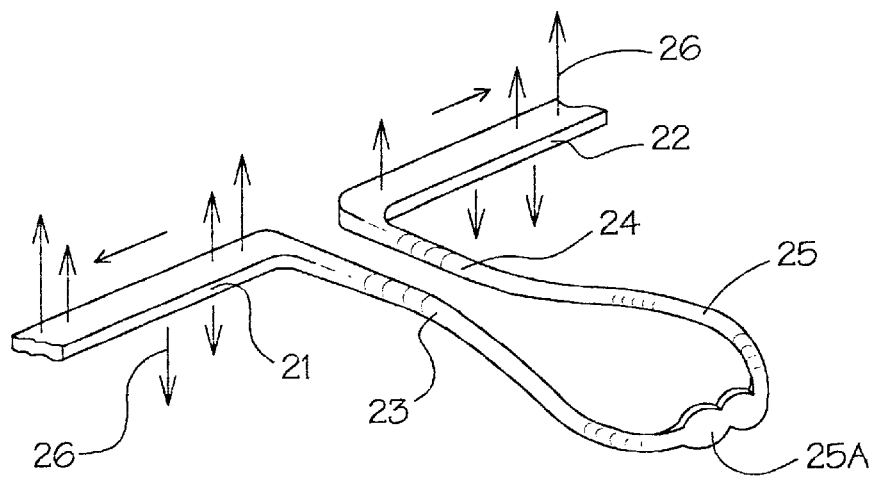
FIG. 9 is a perspective view of the modified flat wire of FIG. 7.

Referring now to FIGS. 7, 8, and 9 of the drawings, a first alternate infrared wire configuration 20 can be seen having an initial flat wire main body portions 21 and 22 which then transcends into a cross-sectionally round spaced parallel wire portions 23 and 24 having an expansion loop 25 formed therein. A portion of the loop 25 has an area of reduced transverse dimension at 25A defining a thermal hinge. The alternate wire configuration 20 is useful when flat infrared wire is required to direct infrared energy along its vertical axis when the wire is viewed cross-sectionally as indicated by the energy radiation directional arrows 26 in FIG. 9 of the drawings.

Figure 4:
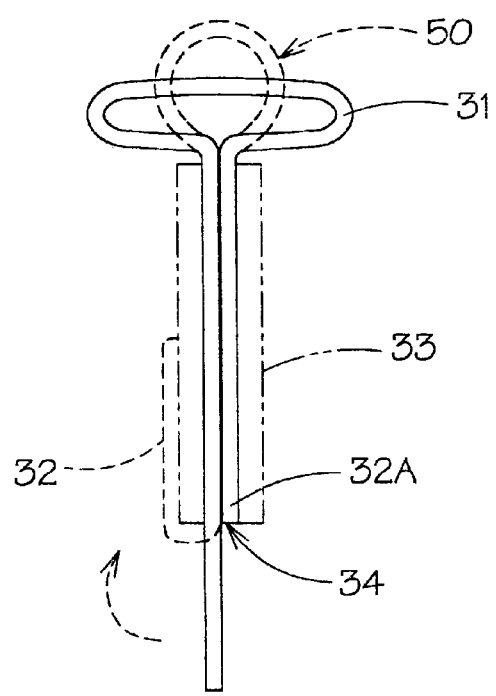
FIG. 4 is an enlarged side elevational view of a wire engagement element of the mounting support fixture.
Figure 5:
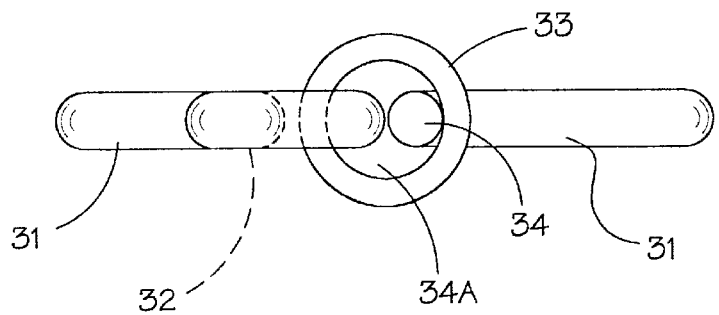
FIG. 5 is an enlarged bottom plan view of the wire engagement element.
Figure 6:
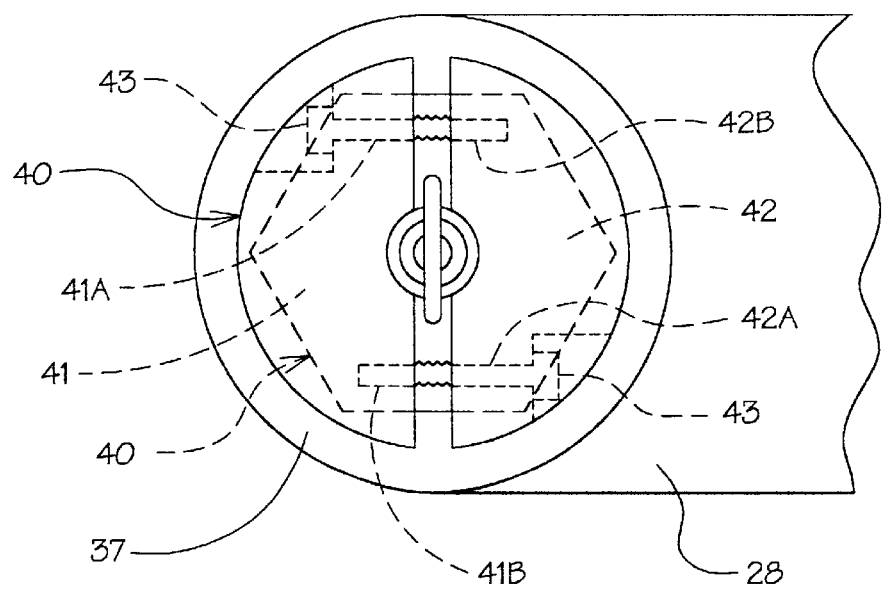
FIG. 6 is a top plan view of the wire mounting surface fixture.

Referring now to FIGS. 2, 3, 4, 5 and 6 of the drawings, the hereinbefore disclosed infrared wire configurations 10 and 20 can be secured to a mounting fixture 27 illustrated in FIG. 2 and 6 of the drawings specifically. The mounting fixture 27 has a main base 28 with an internally threaded aperture at 29 adjacent its terminal end at 30. A mounting engagement wire 31 is formed around the respective infrared wires 10 and 29 with its free ends 32 and 32A extending into a mounting sleeve 33 shown in broken lines in FIG. 4 and in solid lines in FIG. 2. The mounting wire free end 32 extends from the mounting sleeve 33 and is bent back thereagainst securing same within the sleeve. The mounting wire fixed end 32A terminates within the sleeve 33 adjacent its open end at 34.

Figure 3:
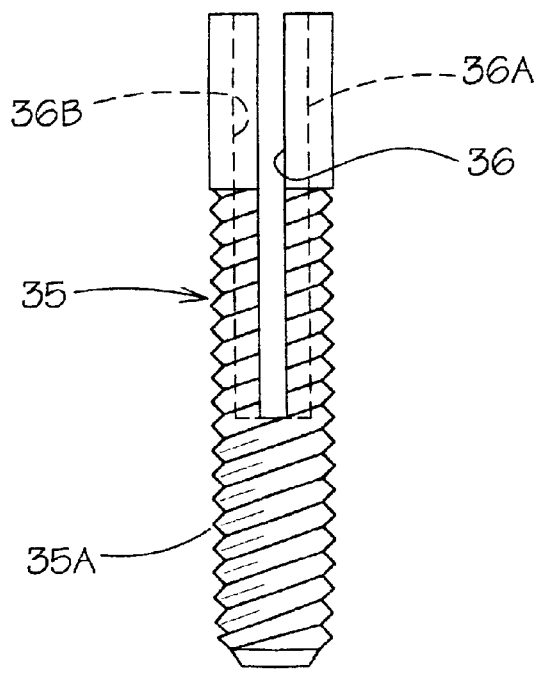
FIG. 3 is an enlarged side elevational view of the threaded mounting insert stud of the mounting support fixture.

A mounting stud 35, best seen in FIG. 3 of the drawings and in broken lines in FIG. 2 of the drawings, has a threaded portion 35A with a split opening 36 extending partially therethrough. Elongated oppositely disposed contoured recesses 36A and 36B are formed within the stud 35 shown in dotted lines in FIG. 3.

The mounting stud 35 is threadably disposed within the aperture 29 in the main base 28. Spacing elements 37 and 38 are positioned over the portion of the mounting stud 35 that extends from the main base 28. A threaded nut 39 is registerably positioned on the threaded portion 35A of the mounting stud 35 securing the spacing elements 38 and 39 against the main base 28 and defines an upper support surface for a split compression fitting 40. The split compression fitting 40 has a first half 41 and a second half 42 each of which has correspondingly aligned apertures therein at 41A and 42A. Threaded fasteners 43 extend through the respective apertures 41A and 42A and engage into corresponding aligned threaded apertures 41B and 42B as is well known and understood within the art. The mounting sleeve 33 with the mounting wire insert 31 is engaged and held by the compression fitting 41 within an opening formed therebetween by the respective elongated contoured recesses 36A and 36B as hereinbefore described and best seen in FIG. 6 of the drawings.

It will be seen that the mounting assembly 27 with the secured mounting sleeve 33 therein and mounting wire 31 formed about the infrared wire configurations provides a secure insulated and isolated support for the infrared wires 10 and 20 of the invention.

Figure 10:
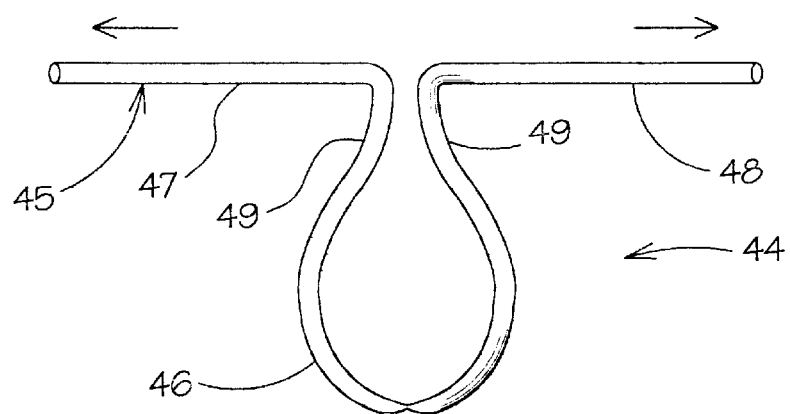
FIG. 10 is a top plan view of a second alternate form of the wire loop expansion element of the invention illustrating an all around wire with an expansion loop having an thermal expansion hinge area associated therewith.

Referring now to FIG. 10 of the drawings, a second alternate form 44 of the expansion loop of the invention can be seen wherein a cross-sectionally rounded infrared wire 45 is illustrated having an expansion loop 46 formed therein. Respective main body wire portions 47 and 48 have an integral loop extensions 49 extending directly therefrom.

It is important to note that the actual distant between the respective main body wire portions 14 and 16, 21 and 22 and 47 and 48 is closer than illustrated in the drawing which are spaced for illustration clarity since the actual distance is that equal to that required to maintain an effective radiant infrared energy output therebetween so that same is uninterrupted in effect. Accordingly the effective expansion of the infrared wires during use is typically 0.0006 of an inch.

The mounting sleeve 33 is of a split rolled pin metal composition type and have an inside diameter equal to twice that of the individual mounting wire's diameter as illustrated in FIG. 5 of the drawings so as to provide an effective engagement therewith.

An alternate mounting wire configuration 50 can be seen in dotted lines in FIG. 4 of the drawings which is applicable when mounting the alternate form 44 of rounded infrared wire configuration as hereinbefore described and illustrated in FIG. 10 of the drawings.

It will thus be seen that a new and novel infrared wire configuration has been illustrated and described for the purposes of accommodating expansion of the infrared wire during use and associated mounting and support system and that various changes and modifications can be made therein without departing from the spirit of the invention.

Therefore I claim:

1. An expansion apparatus in combination with an infrared energy radiation wire comprising; an expansion loop formed within a portion of said infrared energy radiation wire, said loop having oppositely disposed contoured end portions within the loop, means for interconnecting said contoured end portions to one another within the loop.

2. The expansion apparatus for infrared energy radiation wire set forth in claim 1 wherein said means for interconnecting said contoured end portions within the loop to one another comprises; a fixation fastener extending through aligned apertures overlapping end portions of said respective contoured end portions.

3. The expansion apparatus for infrared energy radiation wire set forth in claim 1 wherein said infrared energy radiation wire is cross-sectionally flat having opposing radiant energy surfaces.

4. The expansion apparatus for infrared energy radiation wire set forth in claim 1 wherein said expansion loop is of a known cross-sectional round dimension and a portion of said loop is of an increased transverse dimension defining a thermal hinge.

5. The expansion apparatus for infrared energy radiation wire set forth in claim 1 wherein said expansion loop is of a cross-sectionally flat dimension and said infrared energy radiation wire is of a cross-sectionally round dimension.

6. An expansion and mounting apparatus for infrared energy radiation sources used in the welding of thermoplastic parts comprising; an infrared energy radiation wire, a source of electrical energy in communication with said infrared energy radiation wire, an expansion loop formed in said infrared energy radiating wire, said loop having spaced parallel wire portions extending therefrom, an areas of reduced transverse dimension in said loop area defining a thermal hinge, means for selectively securing said infrared energy radiation wire to a mounting fixture.

7. The expansion and mounting apparatus for infrared energy radiation source as set forth in claim 1 wherein said infrared energy radiating wire is cross-sectionally flat.

8. The expansion and mounting apparatus for infrared energy radiation source as set forth in claim 1 wherein said infrared energy radiation wire is cross-sectionally round.

9. The expansion and mounting apparatus for infrared energy radiation source as set forth in claim 1 wherein said expansion loop is cross-sectionally round.

10. The expansion and mounting apparatus for infrared energy radiation source as set forth in claim 1 wherein said expansion loop is cross-sectionally flat.

11. The expansion and mounting apparatus for infrared energy radiation source as set forth in claim 1 wherein said means for selectively securing said infrared energy radiating wire to a mounting fixture comprises; a deformable mounting wire conforming to the infrared energy wire, a mounting sleeve on a portion of said deformable mounting wire, an engagement mounting stud threadably secured to a fixation base, means for adjustably securing said mounting sleeve within said engagement stud.

12. The expansion and mounting apparatus for infrared energy radiation source as set forth in claim 11 wherein said means for adjustably securing said mounting sleeve within said engagement stud comprises; a compression fitting engageable on a portion said engagement stud.

* * * * *